United States Patent

Sentagnes et al.

[11] Patent Number: 5,914,031
[45] Date of Patent: Jun. 22, 1999

[54] PROCESS IN A REDUCING MEDIUM OF CHEMICALLY TRANSFORMING COMPLEX CHEMICAL STRUCTURES IN A SUPERCRITICAL FLUID

[75] Inventors: Dominique Sentagnes, Bordeaux; Bernard Berdeu, Villenave D'ornon; Gérard Demazeau, Gradignan; Yves Garrabos, Pessac; Alain Largeteau, Cestas, all of France

[73] Assignee: L'Electrolyse, Latresne, France

[21] Appl. No.: 08/849,265

[22] PCT Filed: Dec. 5, 1995

[86] PCT No.: PCT/FR95/01600

§ 371 Date: Jul. 24, 1997

§ 102(e) Date: Jul. 24, 1997

[87] PCT Pub. No.: WO96/17680

PCT Pub. Date: Jun. 13, 1996

[30] Foreign Application Priority Data

Dec. 6, 1994 [FR] France .................................. 94 14664

[51] Int. Cl.[6] ...................................................... C07C 1/00
[52] U.S. Cl. .............................. 208/952; 208/13; 585/240
[58] Field of Search ........................ 208/952, 13; 585/240

[56] References Cited

U.S. PATENT DOCUMENTS

| 4,483,761 | 11/1984 | Paspek, Jr. ................................ 208/160 |
| 4,840,725 | 6/1989 | Paskek ...................................... 208/130 |
| 5,118,447 | 6/1992 | Cox et al. ................................. 252/626 |

FOREIGN PATENT DOCUMENTS

| 0 157 339 | 10/1985 | European Pat. Off. . |
| 92 18426 | 10/1992 | WIPO . |

*Primary Examiner*—Bekir L. Yildinm
*Attorney, Agent, or Firm*—Michael N. Meller

[57] ABSTRACT

Chemical transformation of complex chemical structures in a supercritical medium.

The transformation of one or more chemical structures (20) involves at least one reduction reaction in a solvent (22) in the supercritical state.

Application to the destruction of dangerous products, the treatment of industrial effluents and natural products and the modification of molecular structures.

16 Claims, 2 Drawing Sheets

PROCESS IN A REDUCING MEDIUM OF CHEMICALLY TRANSFORMING COMPLEX CHEMICAL STRUCTURES IN A SUPERCRITICAL FLUID

TECHNICAL FIELD

In general terms the present invention relates to a process for the transformation of complex chemical structures in a supercritical fluid.

The term complex chemical structure is understood to mean any chemical system, i.e. any combination of atoms or molecules, which can be solid, liquid or gaseous. The complex chemical structure can either be of an organic nature, such as e.g. heavy oils or aromatic compounds, or of an inorganic or mineral nature such as e.g. nitrates, metal acetates, hydroxide sludge, etc.

In addition, the transformation can either apply to a single chemicals structure or to a combination of complex chemical structures. In this particular case, a synergetic effect can be involved, one of the complex chemical structures being able to serve as a catalyst with respect to the other or its decomposition products.

The invention has applications in widely varying fields. It can e.g. be applied to the modification of molecular structures in molecular engineering or in pharmacology. It can also be applied to the decomposition of industrial effluents, e.g. the decomposition of deinking sludge or metal hydroxide sludge. The invention can also be applied to the destruction of explosives or dangerous products, such as e.g. polychlorobiphenyls (PCB). Yet another field can be the recycling of natural products, such as e.g. effluents of wine and spirit storehouses and those resulting from the treatment of milk.

PRIOR ART

In general terms, complex chemical structures can be transformed, decomposed and separated into gas, liquid and/or solid phases through physicochemical processes involving polyphase systems. Supercritical fluids have the advantage through a monophase system—supercritical state—of better controlling the complex structure transformation process.

Oxidizing treatments in a supercritical medium, mainly in water, have been studied and developed. In this connection reference can be made to document (1), WO-A-81/00855, which relates to the treatment of organic materials in supercritical water. The products obtained during this treatment are essentially carbon dioxide and monoxide. This document also provides for the use of hydrogen trapping metals (Ni, Mo, Co, Pd, Pt) and their oxides as treatment catalysts.

In general terms, the exothermic character of the reactions involved in the treatments by oxidation is in known manner utilized in the at least partial maintaining of the treatment process. This is particularly the case when the treatment is performed with supercritical water, whose critical temperature is close to 374° C.

Oxidation treatment processes in a supercritical medium of a known nature can suffer from a certain number of limitations and disadvantageous effects. Reference can firstly be made to the fact that the heat produced during the treatments is difficult to store, which leads to significant energy losses if it is not possible to directly consume it in situ. Moreover, the decomposition or transformation of effluents generally leads to relatively unvalorizable products, or at least which are not directly valorizable, such as e.g. $H_2O$, $CO_2$ and CO.

Another problem is that of the corrosion and mechanical behaviour of treatment enclosures and more generally confinement means and enclosure supply systems. These means are generally made from metals or alloys sensitive to the oxidizing treatment.

Treatments other than those involving oxidation in a supercritical medium are e.g. known from EP-A-157 339, which describes a process making it possible to prepare hydrocarbons, preferably in saturated form, from purification plant sludge with a water content of 70 to 98.5%, by the treatment of said sludge at 300 to 600° C. and a pressure of 100 to 500 bars. Immediately after this treatment at high temperature and pressure, or simultaneously with said treatment, the sludge undergoes a hydrogenation with molecular hydrogen addition at a rate of 2 to 25 wt. % and necessarily in the presence of a catalyst. The temperature and pressure are then lowered in stages in order to subdivide the gas phase into several fractions.

U.S. Pat. No. 5,118,447 relates to a process for the denitrification of nitrogen compounds, particularly nitrates and nitrites present in numerous industrial aqueous effluents e.g. from the chemical industry, surface treatment industries, as well as the explosives and ammunition industries. This process involves stages consisting of determining the concentration of nitrates and nitrites present in an effluent, inducing in said effluent the presence of formate as a reducing agent for nitrates and nitrites, heating the mixture at a temperature of 200 to 600° C. and at an adequate pressure for maintaining the liquid effluent in a monophase range, either liquid, or supercritical, for an adequate residence time to reduce the nitrate and nitrite content and essentially provide nitrogen, carbon dioxide gas, carbonates and bicarbonates. Thus, the temperature and pressure ranges are very restricted and very close to the limit of the supercritical range, which can even leave the effluent to be treated in the liquid state in a subcritical range.

One aim of the present invention is to propose a process for the transformation of chemical structures not suffering from the disadvantages and limitations of the processes mentioned hereinbefore.

Another aim of the invention is to propose a process for the transformation of chemical structures leading directly either to valorizable products, or to products whose characteristics are in accordance with standards for discharge into the natural environment.

Yet another aim of the invention is a transformation of chemical structures not exposing the enclosures and treatment equipment to a corrosive action, or which at least limits such a corrosive action.

Finally, another aim of the invention is a process involving neither molecular hydrogen, nor catalyst and which makes it possible by controlling parameters such as the temperature, pressure and chemical parameters, to control and orient at random the reactions and transformations occurring in the supercritical range of the fluid or reaction medium in order to obtain desired valorizable products as required.

DESCRIPTION OF THE INVENTION

In order to achieve these aims, the invention more specifically relates to a process for the chemical transformation of at least one complex chemical structure into at least one end product, characterized in that the chemical transformation involves at least one reduction reaction in a solvent in the supercritical state.

In other words, the object of the invention is to aid, through controlled chemical reactions, the decomposition of effluents, molecules or complex chemical structures, at least one of the chemical reaction stages being a reduction.

The term chemical transformation is understood to mean both the decomposition of the molecular or atomic system of the complex chemical structure or structures into one or more chemical structures with a simpler molecular system, and the chemical interaction of the varyingly complex molecular systems with one another or with the solvent in the supercritical state.

The chemical interaction of molecular systems involves various reactions or solubilizations, whereof one or more are reductions.

The reduction phenomenon means any reaction leading for one of the elements of the chemical structure to be decomposed to an electron gain.

A definition will firstly be given of the supercritical state in which the reduction or reductions take place with respect to the solvent. For example, the solvent can be water, an alcohol such as ethanol, a water-alcohol mixture, or any other appropriate solvent. Its choice is essentially dependent on the chemical structures which it is wished to transform.

Moreover, on the basis of on the one hand the specific physicochemical properties of supercritical fluids and on the other the reducing conditions making it possible to preserve certain functions for the end products resulting from the transformation, as a function of the structures to be treated, it is possible to terminate with the decomposition, or the formation of valorizable compounds, as will be shown hereinafter.

According to the invention and in general terms, supercritical media have been used in order to increase the in situ reactivity and according to a specific aspect of the present invention to better control the chemical reactions able to take place in the medium.

According to the particular nature of the chemical structures which it is wished to transform, the performance of the process can be adapted.

In a first variant of the process, the latter can involve the following stages:
  a) formation of a reaction fluid incorporating the complex chemical structure or structures in solution or suspension in the solvent, and at least one additive having a reducing character, e.g. if the reaction mechanism provided do not lead to an adequate reducing character under the use conditions,
  b) bringing into the supercritical condition to bring about the chemical transformation and
  c) return to ambient pressure and temperature conditions.

In the case where either the solvent, or one of the complex chemical structures which it is wished to transform, have a reducing character under supercritical conditions, a specific reducing additive is not indispensable during the formation of the reaction fluid. Stage a) is then merely the formation of a reaction fluid incorporating at least the complex chemical structure or structures in solution or suspension in the solvent, the solvent and/or at least one of the chemical structures of the reaction fluid having a reducing character under the supercritical temperature and pressure conditions of the solvent.

This is the case with an example referred to hereinafter, wherein treatment takes place of deinking sludge of newspapers containing inks having a reducing character under supercritical conditions. The addition of an additive (e.g. sodium hydridoborate) can aid the transformation, but is not indispensable.

It is also possible that none of the chemical structures or the solvent initially present in the reaction medium have a reducing character, but that at least one of them decomposes into a new chemical structure, which is reducing under supercritical conditions.

Stage a) of the process then involves the formation of a reaction fluid incorporating the complex chemical structure or structures to be treated in solution or suspension in the solvent, with at least one of the complex chemical structures or the solvent transforming under supercritical conditions into a compound having a reducing nature. This is e.g. the case for the treatment of casein, which is transformed into light hydrocarbons and carbon.

The supercritical conditioning essentially consists of increasing the pressure and temperature of the reaction medium to values exceeding the critical pressure and critical temperature of the solvent.

Moreover, the reaction fluid generally has 1 to 20 wt. % of complex chemical structures to be transformed.

According to a special aspect of the invention, the reducing transformation can be described in terms of hydrogen equivalents necessary for obtaining the targeted end products during the same.

In this case, it is possible to determine as a function of the sought end products a hydrogen equivalent chemical supply (h.e.c.s.) necessary for the transformation and the composition of the reaction medium is modified in order to have in said medium a hydrogen equivalent chemical supply equal to or greater than the h.e.c.s. resulting from the composition of the reagents (complex chemical structures, solvent), optionally by means of an additive.

Through adjusting the h.e.c.s. it is not possible to orient the transformation towards particular end products such as e.g. $CH_4$ or $C_2H_6$, but also inhibits the possible corrosion of treatment equipment and devices under supercritical conditions by adjusting the h.e.c.s. to a value just above the h.e.c.s. required for obtaining the sought products.

On returning to ambient pressure and temperature conditions, the products obtained from the transformation are separated using known processes such as sedimentation, distillation or a membrane method.

According to a preferred and particularly advantageous embodiment of the invention, the inventors have shown that the supercritical range of the reaction fluid or medium could be divided into at least three large ranges or zones, which will be subsequently called range A, range B and range C.

In the supercritical range of the reaction fluid or medium, range A is a range in which there are low temperatures and high pressures, i.e. the pressure is in excess of the critical pressure of the reaction fluid or medium and is the most suitable for the solubilization of complex chemical structures and/or products in the system or complex mixture or reaction fluid or medium, whilst the temperature is the lowest possible temperature ensuring that one is in the supercritical range of the complex mixture or system or reaction fluid or medium. In this range, the fluid has a density close to that of the liquid phase. Thus, the solubility of the complex chemical structures is greatly facilitated in this range.

In the supercritical range of the reaction fluid or medium, range B is a high temperature range, i.e. the temperature exceeds the critical temperature of the reaction medium and is the most suitable for the decomposition of products and/or complex chemical structures in the reaction fluid or medium, whilst the pressure is the lowest pressure ensuring that one is in the supercritical range of the complex mixture or system or the reaction fluid or medium.

In this range, the fluid has a much lower density. The solubility of the complex chemical structures is reduced, but conversely the decomposition and/or dilution reactions are much greater.

In the supercritical range of the reaction fluid or medium, range C is an intermediate range, where the temperatures and pressures are intermediate or complimentary of those defined for ranges A and B. Thus, in this range there is both a solubilization of complex structures and a decomposition of said structures and an optimization can take place there between thermal decomposition and solubility.

According to the invention, in this preferred embodiment it is possible to control the complex chemical transformation through one or more of these different ranges in order to obtain perfectly targeted, sought end products. Thus, it is possible to carry out the treatment of the reaction medium containing at least one complex chemical structure in a single range or successively in two, three or more of these ranges, the order in which each of the ranges A, B and C. is traversed possibly being different.

However, according to the invention, it is essential that throughout the process one remains within the supercritical range of the complex mixture or system or reaction fluid or medium. In other words, according to the invention, one is constantly in a monophase range, which is exclusively a supercritical range, unlike in the prior art as is e.g. defined by U.S. Pat. No. 5,118,447, where one is certainly in a monophase range, but not excluding the liquid state.

Thus, unlike in the present invention, particularly in this preferred embodiment, EP-A-157 339 involves a hydrogenation by molecular hydrogen and is specifically limited to purification plant sludge, which is restrictive with respect to the aforementioned aims.

The use of molecular hydrogen and the absence of an appropriate choice of pressure and temperature conditions in the supercritical range for favouring the reaction necessitate in said document the use of catalysts for the hydrogenation stage. The uncontrolled introduction of molecular hydrogen can displace the monophase equilibrium of the supercritical medium into two phases, i.e. liquid and gas.

However, the present process controls the pressure and temperature conditions in a range, or in accordance with a cycle, in the exclusively supercritical range of the reaction medium or fluid, which favours the targeted chemical reactions. Everything takes place in order to use all the hydrogen in atomic form available in the reaction fluid. If necessary, a supply takes place by means of hydrogen additives for which the binding energy between the hydrogen and the atom to which it is bonded is lower than the binding energy between the hydrogen atoms in molecular hydrogen. This addition can be controlled by h.c.e.s. Under these conditions, there is no need to use catalysts.

In the same way, the aforementioned U.S. Pat. No. 5,118,147 describes a process where the aim is to be in a very restricted pressure and temperature range close to the limits of the supercritical range and it is even possible to leave the effluent to be treated in the liquid state, i.e. in a subcritical range.

However, the process according to the invention imposes remaining in the supercritical range of the reaction fluid and permits a wide movement within this range.

The nature of the chemical reactions which can take place within the fluid, i.e. the complex mixture or system in the supercritical state will consequently depend:

on the one hand on the parameters P and T, which condition the aptitude for the initial complex chemical structure or its components to solubilize and the energy necessary for inducing the reaction or reactions, on the other hand characteristic parameters of the chemical conditions of the medium, namely essentially the h.e.s.c. value able to control the reduction stage, the pH-value, etc.

The control of these various parameters, on the one hand parameters P and T and on the other the chemical parameters, makes it possible to orient at random the chemical reactions occurring as a function of the valorizable products which it is wished to obtain.

This flexibility and control of the process make it possible to master the formation of the products obtained is not disclosed or suggested by the prior art documents and constitutes one of the surprising advantages and effects obtained by the process of the invention in this preferred embodiment.

For example, if the process takes place solely in the above-defined range A, provided that the starting effluent or medium and the chemical complex structures therein allow it, compounds such as longchain hydrocarbons are preferably obtained.

When only placed in range B or a reaction cycle starting in range A takes place, then continuing in range B, products such as short-chain hydrocarbons will be obtained.

It is also possible to perform a cycle of reactions starting by the maximum solubilizing of the reagents in range A (thus creating long chains), followed by a displacement towards range B in order to progressively favour, on passing through range C, chain breaks induced by the temperature.

According to this preferred embodiment of the invention and through control via the various ranges, there is a residence time in the supercritical range of the reaction medium much shorter than in the prior art and generally equal to or below 10 minutes (e.g. between 1 and 5 minutes) and can even be one or a few seconds or less ($1/10$ or $1/100$ second). Therefore, in the process according to the invention there are fewer or virtually no more or less uncontrollable intermediate reactions leading to end products which are not desired.

According to the invention, the chemistry of the process is perfectly controlled by the parameters indicated hereinbefore and more particularly by the temperature and pressure making it possible to adjust and optimize the reaction rate.

Thus, according to the invention there is an increase in the kinetics of the reaction by acting solely on the temperature and pressure without it being necessary to add a catalyst, which is obligatory in the prior art.

On also acting on the h.e.c.s., e.g. by increasing it by adding a hydride such as $NaBH_4$, it is possible to effect a supplementary orientation of the chemical reactions and direct them towards the production of specific products.

Thus, in the cases referred to hereinbefore, it is possible to obtain saturated as opposed to unsaturated long or short-chain products.

Other features and advantages of the invention can be gathered from the following non-limitative embodiments.

DESCRIPTION OF EXPERIMENTAL PERFORMANCE EXAMPLES OF THE INVENTION

Figure 1:
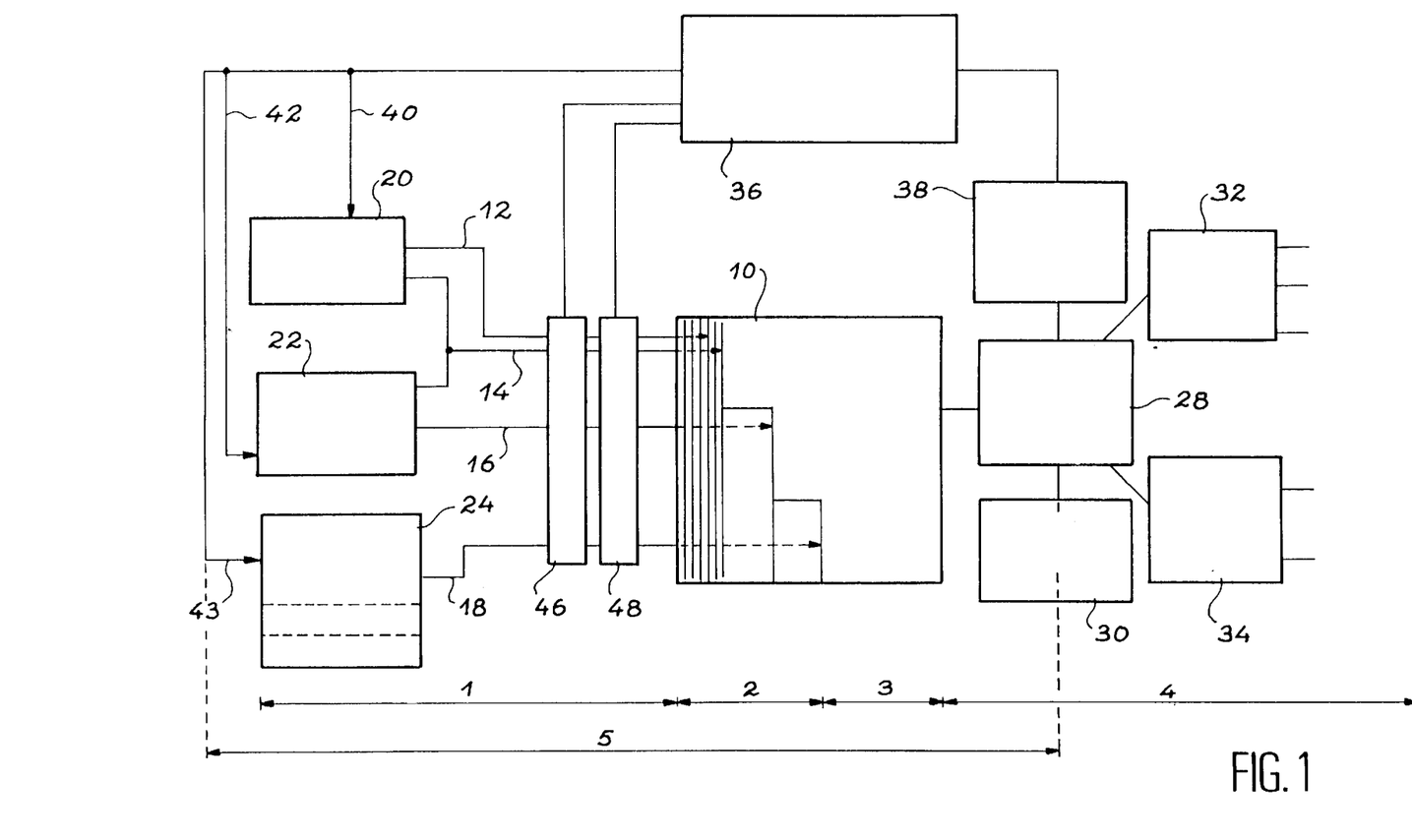
FIG. 1 is a diagram illustrating in diagrammatic manner a performance of a chemical transformation process according to the invention.

FIG. 1 shows both the main stages of the process and their chronological order.

A double arrow 1 designates the constitution of a reaction medium appropriate for the optimization of the reduction or transformation of at least one complex chemical structure.

As designated by 2, this is followed by the mixing and conditioning of the reaction medium corresponding to the supercritical state of the solvent used.

The double arrow 3 designates the chemical transformation in supercritical conditions with at least one reduction reaction and the double arrow 4 designates the recovery, analysis and separation of the products of the transformation.

A reactor 10 is respectively supplied by lines 12, 14, 16 and 18 with one or more complex chemical structures 20, a solvent 22 and optionally one or more additives 24.

The chemical structure or structures to be transformed can be dissolved or suspended in the solvent in reactor 10, which corresponds to lines 12 and 14. It is also possible for the chemical structures to already be suspended or dissolved in a liquid phase constituting the solvent, which corresponds to line 12 and optionally 16 when the term solvent is broadened to complex chemical structure. For example, when it is wished to treat deinking sludge, the latter incorporates cellulose and inks in suspension in water. Thus, the cellulose and inks are the complex chemical structures to be transformed and water is the solvent, whose quantity can be controlled. The chemical structure-solvent mixture is in this case formed prior to its introduction into the reactor (line 14).

On leaving the reactor 10, references 28 and 30 designate the recovery and analysis of the transformation products. The recovered products are then separated into valorizable products 32 (solid, liquid or gaseous), i.e. which can be recycled and stored, and also non-valorizable products 34. Finally, the double arrow 5 indicates the control range of the process.

In order to orient the transformation towards the targeted end products and for optimizing the desired reactions, it is possible to adjust the composition of the initial mixture. The control of the composition 36 is performed as a function of the analysis 38 of the products from the transformation.

Arrows 40, 42, 43 designate an initial adjustment of the composition of the reaction fluid, i.e. the chemical structure-solvent-reducing additive (optionally) mixture. In the case of a hydrogenation, the adjustment of the reaction fluid composition takes place with a view to having an adequate h.e.c.s.

A control consists of checking the pH and/or h.e.c.s. of the reaction fluid. This control carries the references 46 and 48. It should be noted that the adjustment of the pH and/or the h.e.c.s. in 46 and 48 can essentially take place by acting on the additive supply of the reactor 10, but can also relate to the supply of chemical structures or solvent. In particular, one or more additives respectively controlling the reducing character, pH or h.e.c.s. can be dosed or metered.

For example, during the transformation of a complex structure of formula $C_xH_yO_zM_i$ and if the sought main end product from the reduction is $CH_4$ the h.e.c.s. can be defined as the hydrogen equivalent chemical supply for transforming all the carbon into $CH_4$ under the conditions of the experiment and taking account of the hydrogen equivalents already present in the initial complex structure. This h.e.c.s. can e.g. be defined in milligrams of reducing additive per gram of starting material.

If it is imagined that the complex structure $C_xH_yO_zM_i$ of mass $12x+y+16z+Z_i$ (Z=mass of element M) is diluted in 10 liters of solvent (dissolving or suspending), the h.e.c.s. can also be defined relative to the volume, i.e. per liter of solvent.

Thus, in order to transform 12x grams of carbon, it is necessary to have 4x grams of hydrogen, but y hydrogen equivalents already exist within the complex structure, so that the necessary h.e.c.s. is(4x−y) grams or $(4x-y).10^3$ mg, i.e. $(4x-y)10^2$ mg/liter. The reducing additive quantity to be supplied will depend on its aptitude, e.g. to release hydrogens (or hydrogen equivalents) per gram. It is then introduced through the control.

In the case where the reducing agent contains no hydrogen, it is necessary to take into account its aptitutde to trap oxygen in such a way as to maintain the ratio.

$$\frac{C_x}{H_y}.$$

Moreover, one of the complex structures, or one of the products resulting from the decomposition of one of them can serve as a catalyst for obtaining targeted end products.

The influence of different parameters governing the transformation can be gathered from the following examples.

EXAMPLE 1

The following table I refers to a first experimental performance example of the invention, in which approximately 30 to 125 ml of reaction fluid with a pH of 7 containing in suspension 3 to 5 wt. % of sludge obtained from a deinking cell used for treating magazines (coloured inks) are treated under various conditions of pressure (30<P<90 MPa) and temperature (500<T<600° C.) within a tight 150 cm³ reaction enclosure. The reaction fluid quantity introduced into the enclosure then makes it possible to control, for a given temperature, the final pressure in accordance with its thermal expansion value. Table I gives the evolution of the solubilization conditions of sludge as a function of the treatment parameters (pressure P and temperature T). The duration of the treatment (duration of the period where P and T have constant values) is 5 minutes.

It should be noted that the solubility increases when the pressure decreases. The gas quantity produced is too low to be collected and analyzed no matter what the pH value (acid, neutral or basic).

EXAMPLE 2

In a second experimental example, use is made of 30 ml of a reaction fluid with a Ph of 7 containing in suspension approximately 3 to 5 wt. % of deinking sludge identical to that treated in example 1. Addition takes place of 5 ml of ethanol which, in the supercritical range, can induce a reducing character. After treatment under the optimum conditions resulting from example 1 (600° C., 40 MPa, pH 7, 5 min), no longer is any solid residue observed. However, a certain number of gases are revealed, which essentially comprise methane ($CH_4$).

EXAMPLE 3

In a third experimental example, 55 ml of a reaction fluid containing in suspension very black sludge obtained from deinking cells for old newspapers, i.e. with a traditional ink highly charged in carbon materials) are placed in an approximately 150 ml reaction enclosure. The pressure and temperature parameters are adjusted as a function of the relationship between the liquid phase volume introduced and that of the reaction enclosure. More particularly when the temperature is close to 600° C., the pressure is approximately 60 MPa. The duration of the treatment is modified from 3 to 30 and then 60 minutes.

The experimental results are summarized in table II.

From the initial pH value of 7, the pH of the solution passes to 8 after transformation. A largely similar gas volume is collected after reaction in the three cases (3, 30 and 60 min, at 600° C., 600 bar, i.e. 60 mPa).

Gas chromatographic analysis shows that the gas formed in mainly methane ($CH_4$). Thus, as a function of the nature of the ink used for printing, without adding a reducing additive, it is possible to obtain a gas energy source. The treatment can be optimized by adjusting the pressure and temperature conditions, but the duration of the treatment does not have a determinative effect.

EXAMPLE 4

In a very similar manner, a fourth experimental example shows the influence on the results of the pH of the reaction medium prior to treatment.

In this connection, the following table III summarizes the results of a test where, as in the third example, 55 ml of a reaction fluid containing in suspended form very black sludge obtained from deinking cells for old newspapers are placed in a reaction enclosure with a volume close to 150 ml. The corresponding dry matter quantity with respect to the liquid phase is approximately 3 to 5%. The temperature is kept constant (600° C.), as is the duration of the treatment, which is 3 minutes. Several experiments are performed at variable pressure (from 60 to 100 MPa) and for various pH values (4, 7, 13) without adding a reducing additive.

A study of the following tables III and IV shows that low pH values do not facilitate the reduction of the effluent into $CH_4$. However, a pressure increase for the same pH value increases $CH_4$ formation.

Consequently it can be advantageous to adjust the pH of the reaction medium to a substantially neutral value (pH≈7) prior to the treatment, e.g. by adding thereto either a basic additive such as soda, or an acid, such as e.g. hydrochloric acid.

EXAMPLE 5

A fifth performance example for the invention relates to the treatment of an effluent such as a hydrocarbon.

In this example, 30 to 125 ml of a liquid phase containing approximately 3 wt. % of drained car change oil suspended in water are introduced into an approximately 150 ml reaction enclosure. The temperature is maintained at approximately 600° C., the pressure being modified as a function of the reaction fluid quantity introduced into the enclosure.

Table V defines the experimental conditions used, as well as the main results obtained. Study of table V shows that the increase in the pressure tends to favour the decomposition of the oil, as well as gas formation. This is made particularly apparent by a comparison of experiments $B_2$ and $B_6$. The addition of an additive (lithium hydridoborate) giving the reaction fluid a reducing character also makes it possible to reduce the pressure at which the treatment is performed, as shown by experiment $B_7$. In experiment $B_7$, a reducing additive such as $LiBH_4$ has been added in proportions of approximately 0.5 g for 50 ml of reaction fluid. The additive addition also leads to a virtually complete decomposition of the oil and to a greater gas production.

Figure 2:
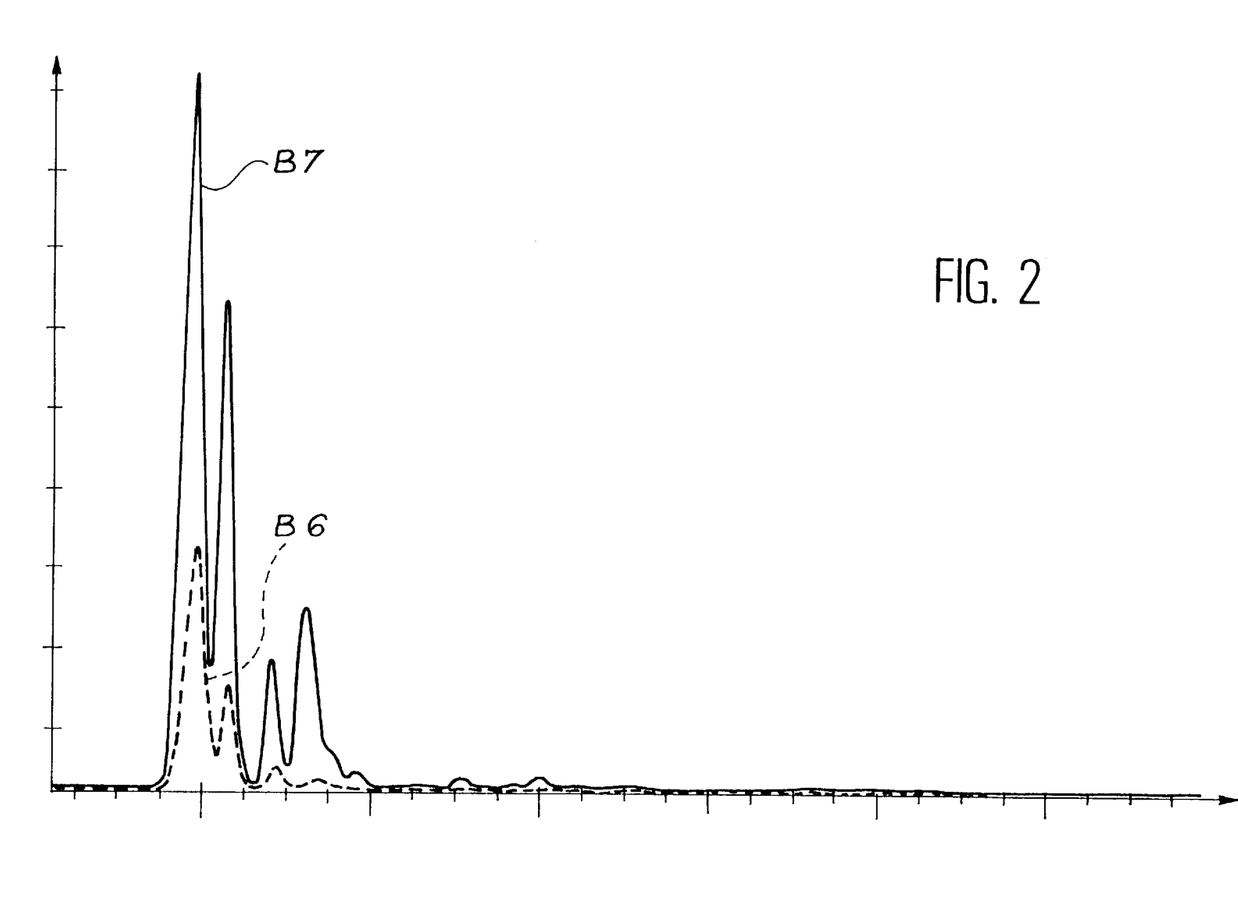
FIG. 2 is a graph representing on the ordinate the gas quantity (exprssed in arbitrary units) produced during a chemical transformation according to the invention, as a function of the time starting from the placing under supercritical conditions of the reaction medium.

FIG. 2 is a graph obtained by chromatographic analysis and illustrates the influence of the reducing additive on the evolution of gas. Curves $B_6$ and $B_7$ respectively correspond to the evolution of gases during experiments $B_6$ and $B_7$.

It would appear that the nature of the gases is substantially the same, mainly for the first peak due to $CH_4$, but the quantity is greatly increased by adding a reducing agent. The optimization of the latter also makes it possible to control the nature and purity of the gas phase obtained as a function of the degree of reduction. It is thus possible to e.g. control the production of saturated or unsaturated hydrocarbons during the treatment.

EXAMPLE 6

This example relates to metal hydroxide sludge and demonstrates that it is possible in this case to evaluate the function of various parameters (pressure, temperature, duration) on their transformation. The experimental results of this example appear in table VI, which shows that the range 600° C., 600 bar (60 MPa) lead to a significant sludge decomposition. The residual solid weight is low. The treatment time does not have a determinative function. It should also be noted that the aqueous phase resulting from the treatment is colourless. An analysis of the main constituents contained in this aqueous phase shows that it completely satisfies the standards controlling discharge into the environment.

EXAMPLE 7

This example relates to grape pressing residues after fermentation and shows that it is possible to apply the process to such combined complex chemical structures.

Use is made of 19 g of this mixture in the presence of 50 $cm^3$ of water, followed by raising to a temperature of 600° C. and a pressure of 800 bar. After 5 minutes under these experimental conditions, the mixture is restored to normal conditions (ambient pressure and temperature). There is a formation of a gas phase containing various hydrocarbons, a liquid phase containing various chemical compounds, particularly terpene derivatives, and a solid phase constituted by pulverulent carbon and weighing approximately 1 g.

EXAMPLE 8

To the mixture of complex chemical structures identical to that treated in example 7 is added 0.1 g of sodium hydridoborate for 19 g of starting matter and 50 $cm^3$ of water, which is treated for 5 minutes at 600° C. and 900 bar. After returning to normal conditions, there is an increase in the volume of the gas phase constituted by light hydrocarbons demonstrating the function of the hydrogen equivalent chemical supply. A liquid phase containing carbon in suspension is also extracted from the reactor. The carbon weight is approximately 1 g.

EXAMPLE 9

50 $cm^3$ of ethanol are introduced into a nickel-cobalt based alloy 150 $cm^3$ reactor. The reactor is raised to a temperature of 600° C., with a pressure of approximately 800 bar. The duration of the treatment under these conditions is maintained at 1 minute, the reactor then being brought to normal conditions. After opening the reactor, the formation of light hydrocarbons resulting from the decomposition of the alcohol in part of the supercritical range is observed.

EXAMPLE 10

125 $cm^3$ of ethanol are introduced into the same reactor as in example 9. The reactor is heated to 275° C., the pressure being close to 550 bar. This treatment is maintained for approximately 2 minutes. After returning to normal conditions and opening the reactor, there is no gas phase and the liquid phase present is constituted by ethanol.

EXAMPLE 11

This example relates to a combination of complex chemical structures of the casein type. Use is made of 5 g of casein in the presence of 50 cm$^3$ of water. The mixture is then raised to 600° C. and the pressure reached is approximately 850 bar. After 10 minutes under these conditions, there is a return to normal conditions.

On opening the reactor, there is a formation of a gas phase constituted by light hydrocarbons, a liquid phase containing various short-chain chemical compounds and very finely divided carbon in suspension. The final carbon weight is approximately 0.15 g.

EXAMPLE 12

This example relates to a combination of complex chemical structures derived from milk and known as lactoserum. Use is made of 50 cm$^3$ of lactoserum and 0.1 g of NaHB$_4$ (sodium hydridoborate). It is raised to a temperature of 600° C., the pressure reached being approximately 750 bar. After such a treatment lasting 15 minutes, there is a return to normal conditions.

After opening the reactor, an inflammable gas phase constituted by light hydrocarbons is formed, as well as a liquid phase with a few carbon particles in suspension.

The following examples 13 to 15 aim at testing with and without h.e.c.s., the decomposition of starting products identical to those of EP-A-157 339 in the aforementioned ranges A, B and C. In examples 13 to 15, the reaction fluid is constituted by water at a pH of 7 with 1 wt. % biological sludge in suspension.

EXAMPLE 13

This example is solely in range A. 13a—one volume of 32 ml of reaction fluid is treated at a temperature of 400° C. and a pressure of 2000 bars (200 MPa) for 10 minutes. After return to normal P and T conditions, it is found that the sludge has largely been decomposed, only leaving a few solid particles in suspension. No gas phase is produced. After separation and analysis, it is found that the liquid phase mainly contains hydrocarbons between C5 and C8.

13b—for a same volume of 32 ml, a treatment identical to that described in 13a is performed, but to the reaction fluid is added 0.6 g of sodium hydridoborate in order to increase the h.e.c.s. of the medium.

For a temperature of 400° C. and a pressure of 1850 bars (185 MPa), the treatment time is 10 min.

On return to normal conditions, there is a better decomposition of the sludge than for example 13a. In particular, the quantity of solid particles has decreased compared with 13a. Thus, the increase of h.e.c.s., linked with the addition of NaBH$_4$, has made it possible to continue the chemical reactions in the supercritical phase. No gas phase was collected. After separation and analysis of the liquid phase, it is found to mainly contain hydrocarbons between C5 and C8.

EXAMPLE 14

14a—the treatment of 54 ml of the predetermined reaction fluid is performed under the following conditions: passage into range A (P=200 bars (200 MPa) T=400° C. for 10 min), then the pressure is lowered and the temperature increased in order to obtain 500 bars (50 MPa) and 600° C. (range B), the latter conditions being maintained for 10 min.

On returning to normal conditions, there is a decomposition of the sludge, which is more complete than in examples 13a and 13b, which is particularly indicated by a clarification of the liquid phase and the presence of far fewer solid particles. A gas phase is also formed.

The separation and analysis of these phases revealed the presence of hydrocarbons from C5 to C8 in solution and methane, ethylene, acetylene, ethane, propane and isobutane in the gas phase.

The methane is in the majority (approximately 56%), the other constituents being ethane (approximately 17%), propane (approximately 12.5%) and unsaturated hydrocarbons of the ethylene or acetylene type in trace form (approximately 0.8%).

14b—the addition of 0.6 g of NaBH$_4$ to the reaction fluid leads, after treatment under the same conditions as in 14a to an even more complete decomposition of the sludge, which corresponds to a maximum decomposition obtained for the series of tests 13a, 13b, 14a, 14b (clarification of the liquid phase and disappearance of the solid particles). A larger gas volume is recovered than in example 14a.

In example 14, as in example 13, the h.e.c.s. increase (linked with the addition of NaBH$_4$) made it possible to continue the chemical reactions.

Analyses of the various phases demonstrated the presence of C5 to C8 hydrocarbons in the liquid and methane, ethylene, acetylene, ethane, propane, butane and isobutane in the gas phase. Methane is in the majority and its presence increases substantially (71%) compared with 14a (56%). There is also an increase in the ethane percentage (approximately 20%).

It is pointed out that the larger gas quantity collected can be attributed to a desorption and a decomposition of hydrocarbons of the liquid phase (C5 to C8) into lighter saturated molecules, said phenomenon being induced by the h.e.c.s. increase.

EXAMPLE 15

After passing into range A, a volume of 32 ml of reaction medium with the addition of 0.6 g of NaBH$_4$ is treated at a pressure of 1100 bars (110 MPa) and a temperature of 600° C. for 10 minutes.

After returning to normal conditions, there is a decomposition of the biological sludge relatively less complete than that observed in the preceding examples (13a, 13b, 14a, 14b). No gas phase was collected. Analysis of the liquid phase shows that it contains in solution C5 to C8 hydrocarbons.

TABLE I

| Ref. | pH | T(° C.) | P(MPa) | time (min) | Residue weight (g/l) | Liquid colour | pH after treatment | Gas |
|---|---|---|---|---|---|---|---|---|
| A control | 7 | — | — | — | — | light grey | — | — |
| A filtered | 7 | — | — | — | 4.121 | chestnut | — | — |
| A1 | 7 | 500 | 95 | 5 | 1.752 | light yellow | 7–8 | traces |
| A2 | 7 | 500 | 40 | 5 | 0.613 | grey-chestnut | 7–8 | traces |
| A4 | 7 | 500 | 72 | 5 | 1.593 | yellow-chestnut | 7–8 | traces |
| A5 | 7 | 500 | 30 | 5 | 0.281 | yellow-chestnut | 7–8 | traces |
| A8 | 7 | 600 | 60 | 5 | traces | very light | 7–8 | traces |
| A9 | 7 | 600 | 40 | 5 | traces | very light | 7–8 | traces |
| A12 | 7 | 600 | 90 | 5 | traces | very light | –8 | traces |
| A14 | 5 | 600 | 40 | 5 | zero | very light | 9–10 | traces |
| A15 | 10 | 600 | 35 | 5 | traces | yellow | 9–10 | traces |

TABLE II

| Ref. | T(° C.) | P(MPa) | time (min) | weight (g/l) | Liquid colour | pH | Gas |
|---|---|---|---|---|---|---|---|
| B | — | — | — | 16.2 | colourless | 7 | — |
| B-4-3-3 | 400 | 30 | 3 | 10.6 | chestnut, precipitation | 7 | traces |
| B-4-3-30 | 400 | 30 | 30 | 10.5 | chestnut, precipitation | 7 | traces |
| B-6-6-3 | 600 | 60 | 3 | 7.7 | colourless | 8 | CH$_4$ pre-dominant and other alkanes |
| B-6-6-30 | 600 | 60 | 30 | 7.4 | colourless | 8 | CH$_4$ pre-dominant and other alkanes |
| B-6-6-60 | 600 | 60 | 60 | 7.2 | colourless | 8 | CH$_4$ pre-dominant and other alkanes |

TABLE III

| Ref. | Initial pH | T(° C.) | P(MPa) | time (min) | Liquid appearance | Final pH | Gas quantity | Gas analysis |
|---|---|---|---|---|---|---|---|---|
| BR | 7 | 600 | 60 | 3 | light + grey deposit | 7–8 | ++ | CH$_4$ |
| BR$_1$ | 4 | 600 | 60 | 3 | dark + black deposit | 6–7 | 0 | – |
| BR$_2$ | 4 | 600 | 100 | 3 | dark + black deposit | 6–7 | + | CH$_4$ |
| BR$_{10}$ | 13 | 600 | 50 | 3 | light grey + grey deposit | 8 | + | CH$_4$ |

The symbols –, +, ++, +++ respectively designate an inadequate presence for analysis of a given product, a limited presence, an average presence and a strong presence of the product.

TABLE IV

| pH initial | T(° C.) | P (MPa) | time (min) | Solution | Gas |
|---|---|---|---|---|---|
| 3–4 | 600 | 60 | 3 | Everything solubilized darker coloured solution | None |
| 3–4 | 600 | 100 | 3 | than with 600° C., 600 bar, pH = 7 | Large quantity (CH$_4$, . . . ) |
| 7 | 600 | 100 | 3 | Dark solution with the presence of a whitish deposit | Very large gas quantity (CH$_4$, . . . ) |

TABLE V

| Ref. | pH | T(° C.) | P (MPa) | time (min) | Pre-sence of oil | pH after treatment | Gas |
|---|---|---|---|---|---|---|---|
| B1 | 7 | 600 | 60 | 5 | − | 7–8 | little (+) |
| B2 | 7 | 600 | 45 | 5 | +++ | 7–8 | too little (−) |
| B6 | 7 | 600 | 110–70 | 5 | + | 7–8 | (++) |
| B7 (+LiBH$_4$) | 7 | 600 | 50 | 5 | + | 9–10 | (+++) |

The symbols −, +, ++, +++ respectively designate an inadequate presence for analysis of a given product, a limited presence, an average presence and a strong presence of the product.

TABLE VI

| Ref. | Treatment conditions | | | Residue | | | |
| | T(° C.) | P (MPa) | time (min) | weight (g/l) | Liquid colour | pH | Gas |
|---|---|---|---|---|---|---|---|
| A untreated | — | — | — | 2.27 | pale yellow | 8 | — |
| A-4-4-3 | 400 | 40 | 3 | 2.03 | colourless | 8 | traces |
| A-4-3-30 | 400 | 30 | 30 | 2.01 | colourless + | 8 | traces |
| A-6-6-3 | 600 | 60 | 3 | 1.66 | colourless ++ | 9 | predominance of nitrogen and oxygen |
| A-6-6-30 | 600 | 60 | 30 | 1.62 | colourless +++ | 9 | predominance of nitrogen and oxygen |

We claim:

1. Process for the chemical transformation of at least one product and/or one complex chemical structure into at least one end product, said chemical transformation involving at least one reduction reaction in a solvent in the supercritical state, characterized in that throughout the process there is a maintaining of an exclusively supercritical range of the reaction fluid or medium incorporating at least one product and/or complex chemical structure in solution or suspension in the solvent, in that there is a control of the chemical transformation through one or more of the different ranges or zones constituting the supercritical range as a function of the at least one end product which it is wished to obtain, by acting on the temperature and pressure conditions, and also by controlling the characteristic parameters of the chemical conditions of the medium, and in that the process is performed without molecular hydrogen supply and without adding a catalyst on a par with said molecular hydrogen supply.

2. Process according to claim 1, characterized in that said different ranges or zones into which is subdivided the supercritical range are as follows:
   a range A in which prevail low temperatures and high pressures, i.e. the pressure exceeds the critical pressure of the reaction fluid or medium and is the best adapted to the solubilization of the products and/or complex chemical structures in the reaction fluid or medium, whilst the temperature is the lowest possible permitting maintaining in the supercritical range of the reaction fluid or medium,
   a range B, which is that in which prevail high temperatures, i.e. the temperature exceeds the critical temperature of the reaction medium and is the best adapted to the decomposition of the complex chemical structures and/or products in the reaction fluid or medium, whilst the pressure is the lowest permitting maintaining in the supercritical range of the reaction fluid or medium,
   a range C, which is an intermediate range in which the pressures and temperatures are intermediate or complimentary of those defined for ranges A and B, i.e. within this range there is both a solubilization of the complex structures and a decomposition of said structures.

3. Transformation process according to claim 1, characterized in that it involves the following stages:
   a) formation of a reaction medium incorporating at least the complex chemical structure or structures in solution or suspension in the solvent, the solvent and/or at least one of the complex chemical structures of the reaction medium having, under supercritical temperature and pressure conditions of the solvent, a reducing character,
   b) placing under supercritical conditions for bringing about the chemical transformation and
   c) return to ambient pressure and temperature conditions.

4. Process according to claim 3, characterized in that at least one of the complex chemical structures in solution or suspension in the solvent having a reducing character under supercritical temperature and pressure conditions of the solvent is a reducing additive chosen from among sodium hydridoborate and any other compound able to supply hydrogen equivalents.

5. Process according to claim 1, characterized in that at least one reduction stage is controlled by acting on the hydrogen equivalent chemical supply.

6. Transformation process according to claim 5, characterized in that, as a function of the sought end product or products, the hydrogen equivalent chemical supply necessary for the transformation is determined and the composition of the reaction medium is modified in order to have in said medium a hydrogen equivalent chemical supply equal to or higher than the hydrogen equivalent chemical supply resulting from the composition of the reagents (complex chemical structures, solvent), optionally by means of an additive.

7. Process according to claim 1, characterized in that action additionally, takes place on the pH.

8. Process according to claim 7, characterized in that the composition of the reaction medium is adjusted in order to obtain a pH close to neutrality.

9. Process according to claim 2, characterized in that the process solely takes place in range A.

10. Process according to claim 2, characterized in that a reaction cycle takes place starting in range A and continuing in range B.

11. Process according to claim 2, characterized in that a reaction cycle is performed starting in range A, continuing in range B and then moving into range C.

12. Process according to claim 1, characterized in that the solvent is chosen among an alcohol, water and a water-alcohol mixture.

13. Process according to claim 1, characterized in that the reaction medium contains 1 to 20 wt. % complex chemical structures to be transformed.

14. Process according to claim 1, characterized in that the residence time of the reaction medium in the supercritical fluid is equal to or less than 10 minutes.

15. Process according to claim 14, characterized in that the residence time is 1 to 5 minutes.

16. Process according to claim 1, characterized in that the end product is a hydrocarbon.

* * * * *